United States Patent [19]

St. Clair

[11] Patent Number: 4,556,464

[45] Date of Patent: Dec. 3, 1985

[54] ENDBLOCK CROSSLINKED BLOCK COPOLYMER ADHESIVE COMPOSITION

[75] Inventor: David J. St. Clair, Houston, Tex.

[73] Assignee: Shell Oil Company, Houston, Tex.

[21] Appl. No.: 728,002

[22] Filed: Apr. 29, 1985

Related U.S. Application Data

[63] Continuation-in-part of Ser. No. 481,595, Apr. 4, 1983, abandoned.

[51] Int. Cl.$^4$ .......................... C08J 3/28; C08L 53/02
[52] U.S. Cl. .......................... 204/159.15; 204/159.17; 204/159.2; 524/270; 524/271; 524/274; 524/505; 525/93; 525/95; 525/98
[58] Field of Search ........... 204/159.15, 159.2, 159.17; 525/93, 98, 95; 524/270, 271, 274, 505

[56] References Cited

U.S. PATENT DOCUMENTS

| | | | |
|---|---|---|---|
| 3,577,398 | 5/1971 | Pace et al. | 526/237 |
| 3,917,607 | 11/1975 | Crossland et al. | 524/474 |
| 4,133,731 | 1/1979 | Hansen et al. | 204/159.17 |
| 4,151,057 | 4/1979 | St. Clair et al. | 204/159.14 |
| 4,320,188 | 3/1982 | Heinz et al. | 204/159.15 |
| 4,430,417 | 2/1984 | Heinz et al. | 204/159.15 |

*Primary Examiner*—Allan M. Lieberman
*Attorney, Agent, or Firm*—Peter A. Bielinski

[57] ABSTRACT

A cured adhesive composition possessing high cohesive strength at high temperatures along with excellent shear strength and solvent resistance prepared using a block copolymer containing carbon-carbon double bonds in the endblocks which are crosslinked by a crosslinking agent preferentially compatible with the endblock phase.

11 Claims, No Drawings

ENDBLOCK CROSSLINKED BLOCK COPOLYMER ADHESIVE COMPOSITION

This is a continuation-in-part of application Ser. No. 481,595, filed Apr. 4, 1983, now abandoned.

BACKGROUND OF THE INVENTION

Monoalkenyl arene/conjugated diene block copolymers are widely used in pressure sensitive adhesives (PSA). PSA based on these polymers have high strength and elasticity at ambient temperatures, making them well suited for use in many general purpose applications, and in packaging and cloth tapes. The high strength and elasticity of these PSAs is due to the well known microphase separated network structure in which the monoalkenylarene endblocks, phase separate to form domains serving to physically crosslink the rubbery midblock phase. However, at temperatures approaching the glass transition temperature of the endblocks or in the presence of an appropriate solvent, the domains soften, releasing the physical crosslinks and the PSA loses its strength and elasticity. Therefore, PSA based on a block copolymer are unsuitable for use in high temperature or solvent resistant tapes, such as automobile masking tapes. The only method of maintaining high cohesive strength in a PSA based on a block copolymer at high temperature or in the presence of solvent is to chemically crosslink the polymer in order that the polymer no longer depends on the physical crosslinks for its strength.

Heinz et al U.S. Pat. No. 4,320,188 discloses a photo printing plate which can be processed at room temperature and which contains endblocks with a glass transition temperature below room temperature. In the composition according to the Heinz disclosure, both phases are elastomeric and neither is a thermoplastic. It is desired in the present application to have a true thermoplastic rubber which contains an amount of unsaturation in the endblock sufficient to facilitate crosslinking but not sufficient to adversely affect the thermoplastic properties of the polymer. The compositions of the present invention are hot melt adhesives which must be processed at 150° C. and a high glass transition temperature is needed so that phase separation can occur at that temperature.

U.S. Pat. No. 4,133,731 claims that the block polymer in a PSA can be crosslinked chemically by including a multifunctional acrylate or methacrylate crosslinking agent in the PSA formulation and exposing the adhesive to high energy radiation such as electron beam (EB) or ultraviolet (UV) radiation. This approach was successful in chemical crosslinking the polymer in the PSA. However, the aggressive tack of the PSA became poorer when the adhesive was crosslinked. In this case, it is apparent that crosslinking occurred in the rubber midblock phase of the polymer. This would be expected to increase the modulus of the adhesive and, in a PSA, to cause reduction in the aggressive tack of the PSA.

We have discovered that a better approach to chemically crosslink the block copolymer in the PSA is to crosslink the polymer through the endblock phase. That is, if the block polymer can be crosslinked through the endblocks, then the polymer can be converted from a thermoplastic to a thermoset with very little change in modulus of the PSA since modulus is determined by the endblock polymer content of the block polymer and by the chain entanglement density of the rubber used in the midblock of the block polymer. As will be shown, there are two requirements which must be met in order to assure that at least part of the crosslinking reactions will occur in the endblock phase. First, the endblocks must contain carbon to carbon double bonds in order that the free radical crosslinking reaction can occur. Second, a crosslinking agent must be included in the formulation which thermodynamically is more compatible with the endblock phase than with the midblock phase and therefore will preferentially concentrate in the endblock phase.

SUMMARY OF THE INVENTION

The present invention broadly encompasses a cured adhesive composition possessing excellent high temperature cohesive strength along with excellent adhesion, shear strength and solvent resistance and a method for making it.

More particularly the invention relates to an adhesive composition prepared by curing
(a) 100 parts by weight of an ABA block copolymer wherein A is a random copolymer of a monoalkenylarene and a conjugated diene and has a glass transition temperature of from 19° C. to 100° C. and B is an elastomeric conjugated diene, wherein the weight percentage of the A blocks in the finished block polymer is between about 4 and about 55 percent;
(b) about 25 to about 200 parts by weight of a tackifying resin compatible with block B;
(c) 0 to about 25 parts by weight of a crosslinking agent preferentially compatible with block A; and
wherein said curing occurs between the monoalkenylarene-conjugated diene copolymer blocks.

DETAILED DESCRIPTION OF THE INVENTION

The block copolymers employed in the present composition are thermoplastic elastomers and have at least two monoalkenyl arene/conjugated diene random copolymer end blocks A and at least one elastomeric conjugated diene polymer mid block B. The number of blocks in the block copolymer is not of special importance and the macromolecular configuration may be linear, graft, radial or star depending upon the method by which the block copolymer is formed. Typical block copolymers of the most simple configuration would have the structure polystyrene/isoprene-polyisoprene-polystyrene/isoprene and polystyrene/butadiene-polyisoprene-polystyrene/butadiene. A typical radial or star polymer would comprise one in which the diene block has three to four branches (radial) or five or more branches (star), the tip of each branch being connected to a polystyrene/isoprene block. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene. A much preferred conjugated diene is isoprene.

The average molecular weights of each of the blocks may be varied as desired. The monoalkenyl arene/conjugated diene polymer blocks (A) preferably have average molecular weights between about 5,000 and 125,000, more preferably between about 7,000 and about 50,000. The elastomeric conjugated diene polymer blocks (B) preferably have average molecular weights between about 15,000 and about 250,000, more preferably between about 25,000 and about 150,000. The average molecular weights of the end blocks are determined by gel permeation chromotography, whereas the polyalkenylarene content of the polymer is measured by infrared spectroscopy of the finished block polymer. The weight percentage of the thermoplastic A blocks in the finished block polymer should be between about 4 and 55%, preferably between about 8% and about 30% by weight.

The block polymers used in the present composition are conventional polymers prepared by conventional block polymer anionic polymerization technology, except that, the endblocks, instead of being the conventionally pure polyalkenylarene, are random copolymer blocks of monoalkenylarene with a second monomer which leaves a carbon to carbon double bond in the monomer unit after polymerization. Examples of suitable monomers for copolymerization with styrene are isoprene, butadiene and diisopropenyl benzene. The concentration of the second monomer in the endblocks should be high enough to assure good crosslinking but not so high that the copolymer endblocks become compatible with the midblock phase and microphase separation does not occur. The concentration of the second monomer in the endblocks should be between about 1 and about 50 mole percent. After preparation of the copolymer endblocks, the rest of the block polymer preparation is conventional, involving for example, addition of the polydiene block followed by coupling.

The block copolymer by itself lacks the required adhesion. Therefore, it is necessary to add an adhesion promoting or tackifying resin that is compatible with the elastomeric conjugated diene block. A much preferred tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl butene and about 10% dimer. See U.S. Pat. No. 3,577,398. Other tackifying resins of the same general type may be employed in which the resinous copolymer comprises 20-80 weight percent of piperylene and 80-20 weight percent of 2-methyl-2-butene. The resins normally have softening points (ring and ball) between about 80° C. and about 115° C. Other adhesion promoting resins which are also useful in the compositions of this invention include hydrogenated resins, esters of rosins, polyterpenes, terpenephenol resins, and polymerized mixed olefins.

The amount of adhesion promoting resin employed varies from about 25 to about 200 parts by weight per hundred parts rubber (phr), preferably, between about 50 to about 150 phr.

The adhesive compositions of the instant invention also may contain plasticizers such as rubber extending or compounding oils or liquid resins. These rubber compounding oils are well-known in the art and include both high saturates content and high aromatics content oils. The amount of rubber compounding oil employed varies from 0 to about 100 phr, preferably about 10 to about 60 phr.

Optionally, an arene-block-compatible resin may be employed. Compatibility is judged by the method disclosed in U.S. Pat. No. 3,917,607. Normally, the resin should have a softening point above about 100° C., as described by ASTM method E 28, using a ring and ball apparatus. Mixtures of arene-block-compatible resins having high and low softening points may also be used. Useful resins include coumarone-indene resins, polystyrene resins, vinyl toluene-alphamethylstyrene copolymers, and polyindene resins. Much preferred is a coumarone-indene resin. The amount of arene-block-compatible resin varies from 0 to about 200 phr.

In order to facilitate crosslinking through the endblock phase a crosslinking agent may be included in the formulation which will preferentially concentrate in the endblock phase. Examples of suitable crosslinking agents for use with styrene endblocks are trimethylolpropane trimethacrylate (TMPTM), trimethylolpropane triacrylate (TMPTA), SARET® 515 (Sartomer Co., Westchester PA), and hexanediol diacrylate (HDODA). A crosslinking agent may not be necessary for crosslinking to occur for example when the composition is cured with electron beam radiation.

The coupling agent may be any chemical which can participate in a free radical crosslinking reaction with the particular block copolymer and which is substantially more compatible with the endblock than the midblock.

The compositions of this invention may be modified with supplementary materials including pigments, fillers, and the like as well as stabilizers and oxidation inhibitors.

The adhesive compositions of the present invention may be applied to the substrate from a solution of up to about 40% weight solids of the ingredients in a solvent such as toluene, the solvent being removed by evaporation prior to crosslinking by exposure to the radiation. Alternatively, the ingredients may be mixed in a solvent, the mixture may be emulsified and the solvent evaporated, and the adhesive may be applied to the substrate as 50–60% weight solids water-based emulsion, the water being removed by evaporation prior to crosslinking. Adhesives of the present invention are especially suited for preparation as 100% solids hot melt adhesives since they give relatively low processing viscosities, usually less than several hundred thousand centipoise at processing temperatures of about 150° C. A preferred method for processing these adhesives to minimize gel formation during hot melt processing is to use an extruder to mix the adhesive and feed the coating die as is disclosed in Korpman U.S. Pat. No. 3,984,509.

The compositions of the present invention can be cured by exposure to high energy radiation such as electron beam radiation or ultraviolet radiation.

The electron beam radiation or high energy ionizing radiation which is employed to effect the crosslinking reaction can be obtained from any suitable source such as an atomic pile, a resonant transformer accelerator, a Van de Graaf electron accelerator, a Linac electron accelerator, a betatron, a synchrotron, a cyclotron, or the like. Radiation from these sources will produce ionizing radiation such as electrons, protons, neutrons, deuterpms, gamma rays, X rays, alpha particles, and beta particles.

The crosslinking reaction is conveniently effected at room temperature, but it can be conducted at depressed or elevated temperatures if desired. It is also within the spirit and scope of the invention to effect the crosslinking reaction within the confines of an inert atmosphere to prevent air inhibition of the crosslinking reaction and to prevent oxidative degradation of the block copolymer.

The amount of radiation required depends primarily upon the type and concentration of crosslinking agent employed and the level of curing desired. Suitable doses of electron beam radiation include 0.2 megarad to about 20 megarads, preferably about 1 megarad to about 10 megarads. Suitable UV radiation doses are those received by a 1.5 mil thick adhesive passing under a medium pressure mercury lamp rated at 200 watts per inch at line speeds of about 5 to about 800 feet per minute, the preferred range being 20 to 400 feet per minute.

When using ultraviolet radiation it is necessary to employ a photoinitiator in order to speed up the crosslinking reaction. Useful photoinitiators are 2,2 dimethoxy-2-phenyl acetophenone, benzophenone, propiophenone, cyclopropyl phenyl ketone, acetophenone, 1,3,5-triacetyl benzene, benzaldehyde, thioxanthane, anthraquinone, beta-naphthyl phenyl ketone, beta-naphthaldehyde, beta-acetonaphthone, 2,3-pentanedione, benzil, fluoronone, pyrene, benzanthrone, and anthracene. While most of these are well-known photoinitiators, other photoinitiators, responsive to UV radiation, would work equally well in the present invention. The present invention is not to be limited to specific photoinitiators, since the many known photoinitiators tested have all tended to work essentially equally well.

A preferred use of the present formulation is in the preparation of pressure-sensitive adhesive tapes or in the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

EXAMPLES

The three polymers described in Table I were used to demonstrate the invention. Polymer 1 is the control since there are no carbon to carbon double bonds in the pure polystyrene endblocks on this polymer. The crosslinking technology involved in studies with Polymer 1 is that taught in U.S. Pat. No. 4,133,731. Polymers 2 and 3 are polymers which can be crosslinked in the endblock phase since the polymers have endblocks which are random copolymers of styrene and isoprene. The endblocks in Polymers 2 and 3 are random copolymer blocks containing a 9/91 and a 46/54 mole ratio of isoprene/styrene, respectively. That is, each endblock in Polymer 2 contains about 10 isoprene units randomly distributed among about 104 styrene units. Each endblock in Polymer 3 contains about 112 isoprene units randomly distributed among about 133 styrene units.

The performance of the three polymers in a simple rubber/tackifying resin blend PSA formulation is given in Table II. Properties of the polymers in an unreactive, unirradiated standard PSA are given first as a basis from which to assess the changes which occur when the adhesives are crosslinked. Results show that all three unirradiated polymers give good adhesives having good tack, peel and holding power at 25° C. and failing cohesively in the SAFT and peel temperature limit (PTL) tests at about 200° F. The adhesives give no gel when soaked in toluene indicating that they, of course, are not crosslinked.

The adhesives were then made reactive by addition of the crosslinking agent, TMPTA, and photoinitiator, IRGACURE 651 (Ceiba Geigy) and were irradiated by UV light. All of the reactive adhesives crosslinked upon irradiation. This is shown by the fact that all adhesives became insoluble in toluene and the failure mechanism in the SAFT test becomes adhesive failure instead of the cohesive failure in the unreactive adhesives.

The benefit of having at least part of the crosslinking occur in the endblock phase should be that crosslinking would be accompanied by less reduction in tack and peel strength. The data in Table II, especially the rolling ball tack results, show that there is less reduction (higher number indicates reduction in rolling ball tack) in tack with Polymer 3 than with Polymer 2 than with Polymer 1.

TABLE I

| Structure[a] | Polymer 1 S-I(9.3–65)$_{8.6}$ | Polymer 2 S/I—I(10.8/ 0.7–61)$_{7.3}$ | Polymer 3 S/I—I(13.9/ 7.6–74)$_{7.0}$ |
|---|---|---|---|
| Coupling Yield[b], % | 95 | 96 | 95 |
| Styrene Content, % w | 12.5 | 12.4 | 13.6 |
| Solution: Viscosity[c], cps | 2600 | 2170 | 4800 |

[a] S and I represent polystyrene and polyisoprene, respectively. S/I indicates a random copolymer. Numbers in parentheses indicate molecular weights × $10^{-3}$. The subscript following the parentheses indicates the average number of arms on the polymer.
[b] Percentage of arms in the reactor which were coupled during the coupling reaction.
[c] Brookfield viscosity at 25° C. of 25% w solution of the polymer in toluene.

Rolling Ball Tack is defined as the distance a small steel ball rolls on an adhesive film with a standard initial velocity. Small numbers indicate aggressive tack. The method is Pressure Sensitive Tape Council Method #6.

POLYKEN Probe Tack is defined as the stress required to separate the end of a steel rod from the adhesive film. POLYKEN Probe Tack test conditions are 1 cm per second probe speed, 100 gm per square centimeter probe pressure and 1 second dwell time. The method is ASTM D2979.

Shear Adhesion Failure Temperature (SAFT) is defined as the temperature at which a 25×25 mm lap shear bond of adhesive tape to Mylar fails under a load of 1 kg when placed in a cabinet whose temperature is increased at 44° F./hour.

Gel refers to the appearance of the rubber in the adhesive after about 6 square cm of tape has soaked in toluene for about 24 hours. If the adhesive is not chemically crosslinked it will dissolve and there will be no gel. If it is only lightly crosslinked it will not completely dissolve and a rather loose gel structure will be found. If the adhesive is properly crosslinked the rubber will be tightly gelled.

Peel Temperature Limit (PTL) is defined as the maximum temperature at which a tape can be rapidly peeled from a hot stainless steel substrate without leaving a heavy adhesive residue on the panel. This is an important property in many masking tape applications. The test is run by applying a 6.4 mm wide strip of tape to a stainless steel panel whose temperature is controlled to give a temperature gradient from about 50° C. to 200° C. at about 6.5° C. per cm. Following a 30 second warm-up the tape is stripped off manually at high speed and approximately at a 90° angle. The equipment used is a "heizbank" type 184321 melting point tester from Reichert Company, Vienna Austria, distributed by Hacker Instrument Company, West Caldwell, N.J.

180° Peel Strength is defined as the stress required to separate a 25 mm wide strip of adhesive tape from a stainless steel panel when peeled at 180° angle at a rate of 12 inches per minute. Method is Pressure Sensitive Tape Council Method #2.

TABLE II

|  | POLYMER 1 | | | | POLYMER 2 | | | | POLYMER 3 | | | |
|---|---|---|---|---|---|---|---|---|---|---|---|---|
| FORMULATION, phr | | | | | | | | | | | | |
| Polymer | 100 | 100 | 100 | 100 | 100 | 100 | 100 | 100 | 100 | 100 | 100 | 100 |
| WINGTACK 95 | 80 | 80 | 80 | 80 | 80 | 80 | 80 | 80 | 80 | 80 | 80 | 80 |
| TMPTA | | 2.5 | 5 | 10 | | 2.5 | 5 | 10 | | 2.5 | 5 | 10 |
| IRGACURE 651 | | 3 | 3 | 3 | | 3 | 3 | 3 | | 3 | 3 | 3 |
| Properties Unirradiated | | | | | | | | | | | | |
| Rolling Ball Tack, cm | 1.0 | | | | 3.2 | | | | 2.5 | | | |
| POLYKEN Probe Tack, gm | 990 | | | | 790 | | | | 1080 | | | |
| Loop Tack, pli | 6.3 | | | | 5.4 | | | | 5.6 | | | |
| 180° Peel, pli | 3.9 | | | | 3.3 | | | | 3.9 | | | |
| SAFT to MYLAR, °F. | 204[c] | | | | 198[c] | | | | 220[c] | | | |
| Peel Temp. Limit, °F. | 210[c] | | | | 205[c] | | | | 175[c] | | | |
| Gel | None | | | | None | | | | None | | | |
| Properties After Irradiation at 50 feet per minute[b] | | | | | | | | | | | | |
| Rolling Ball Tack, cm | | 4.6 | 13 | 17 | | 8 | 8 | 10 | | 4.0 | 6 | 7 |
| POLYKEN Probe Tack, gm | | 820 | 630 | 600 | | 750 | 690 | 500 | | 1120 | 1020 | 790 |
| Loop Tack, pli | | 4.5 | 2.7 | 2.4 | | 3.3 | 2.6 | 1.8 | | 5.0 | 3.6 | 3.8 |
| 180° Peel, pli | | 3.2 | 3.1 | 2.4 | | 3.0 | 2.6 | 2.4 | | 3.4 | 3.0 | 2.5 |
| SAFT to MYLAR, °F. | | 249[d] | 259[d] | 223[d] | | 248[d] | 243[d] | 224[d] | | 248[d] | 235[d] | 215[d] |
| Peel Temp. Limit, °F. | | 210–370[e] | 210–290[e] | >300 | | 210–280[e] | >400 | >400 | | >400 | >400 | >400 |
| Gel | | Loose | Tight | Tight | | Loose | Tight | Tight | | Loose | Tight | Tight |

[a] Adhesives cast from 40% w solutions in toluene onto 1 mil thick MYLAR at 1.5 mil dry adhesive film thickness.
[b] Adhesives under N₂ blanket were exposed to UV light from two 200 watt per inch, medium pressure mercury lamps. UV light was filtered through 1 mil MYLAR.
[c] Cohesive failure.
[d] Adhesive failure at adhesive/adherend interface.
[e] Adhesive failure at adhesive/MYLAR ® backing interface.

What is claimed is:

1. An adhesive composition prepared by curing
   (a) 100 parts by weight of an ABA block copolymer wherein A is a random copolymer of a monoalkenylarene and a conjugated diene and has a glass transition temperature of from 19° C. to 100° C. and B is an elastomeric conjugated diene, wherein the weight percentage of the A blocks in the finished block polymer is between about 4 and about 55 percent;
   (b) about 25 to about 200 parts by weight of a tackifying resin compatible with block B;
   (c) 0 to about 25 parts by weight of a crosslinking agent preferentially compatible with block A; and wherein said curing occurs between the monoalkenylarene-conjugated diene copolymer blocks.

2. The composition of claim 1 wherein said curing is radiation curing.

3. The composition according to claim 1 wherein the type of radiation cure is electron beam irradiation.

4. A composition according to claim 1 wherein the type of radiation cure is ultraviolet irradiation.

5. A composition according to claim 3 also including a photoinitiator.

6. A composition according to claim 1 wherein the crosslinking agent is selected from the group consisting of trimethylolpropane trimethacrylate, trimethylolpropane triacrylate, hexanediol diacrylate and SARET ® 515.

7. A composition according to claim 1 wherein said A block is a random copolymer of styrene and isoprene and said B block is polyisoprene.

8. The composition of claim 1 wherein said A block is a random copolymer of styrene and butadiene and said B block is polyisoprene.

9. The composition of claim 1 wherein said A block is a random copolymer of styrene and diisopropenyl benzene and said B block is polyisoprene.

10. The composition of claim 8 wherein said B block is polybutadiene.

11. A composition according to claim 2 wherein the amount of radiation employed is between 0.2 and about 20 megarads.

* * * * *